J. S. McWHIRTER.

AUTOMATIC TRIPPING MECHANISM FOR CAR FENDERS.

APPLICATION FILED APR. 9, 1915.

1,163,764. Patented Dec. 14, 1915.

Witnesses:
W. Benjamin
S. E. Darby, Jr.

Inventor
John S. McWhirter

By his Attorney
Samuel E. Darby

COLUMBIA PLANOGRAPH CO., WASHINGTON, D. C.

UNITED STATES PATENT OFFICE.

JOHN S. McWHIRTER, OF NEW YORK, N. Y.

AUTOMATIC TRIPPING MECHANISM FOR CAR-FENDERS.

1,163,764. Specification of Letters Patent. Patented Dec. 14, 1915.

Application filed April 9, 1915. Serial No. 20,180.

*To all whom it may concern:*

Be it known that I, JOHN S. McWHIRTER, a citizen of the United States, residing at New York, in the county and State of New York, have made a certain new and useful Invention in Automatic Tripping Mechanism for Car-Fenders, of which the following is a specification.

This invention relates to automatic tripping mechanism for car fenders.

The object of the invention is to provide means operated by the application of the emergency brakes, or automatically by the actuation of the emergency brake lever or handle, for tripping the car fender.

The invention consists substantially in the construction, combination, location and relative arrangement of parts, all as will be more fully hereinafter set forth, as shown in the accompanying drawing, and finally pointed out in the appended claims.

Figure 1:
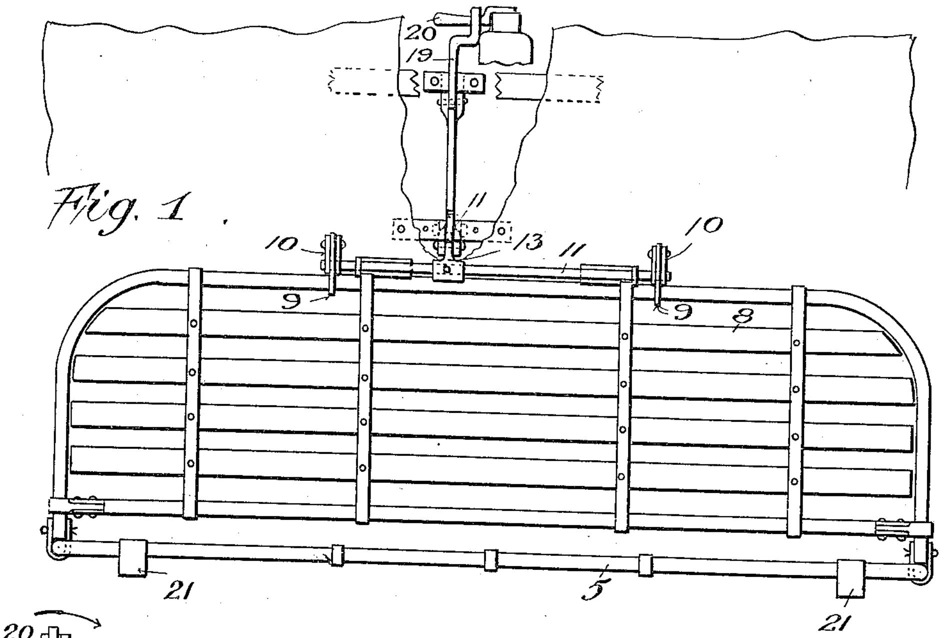
Figures 2, 3, 4:
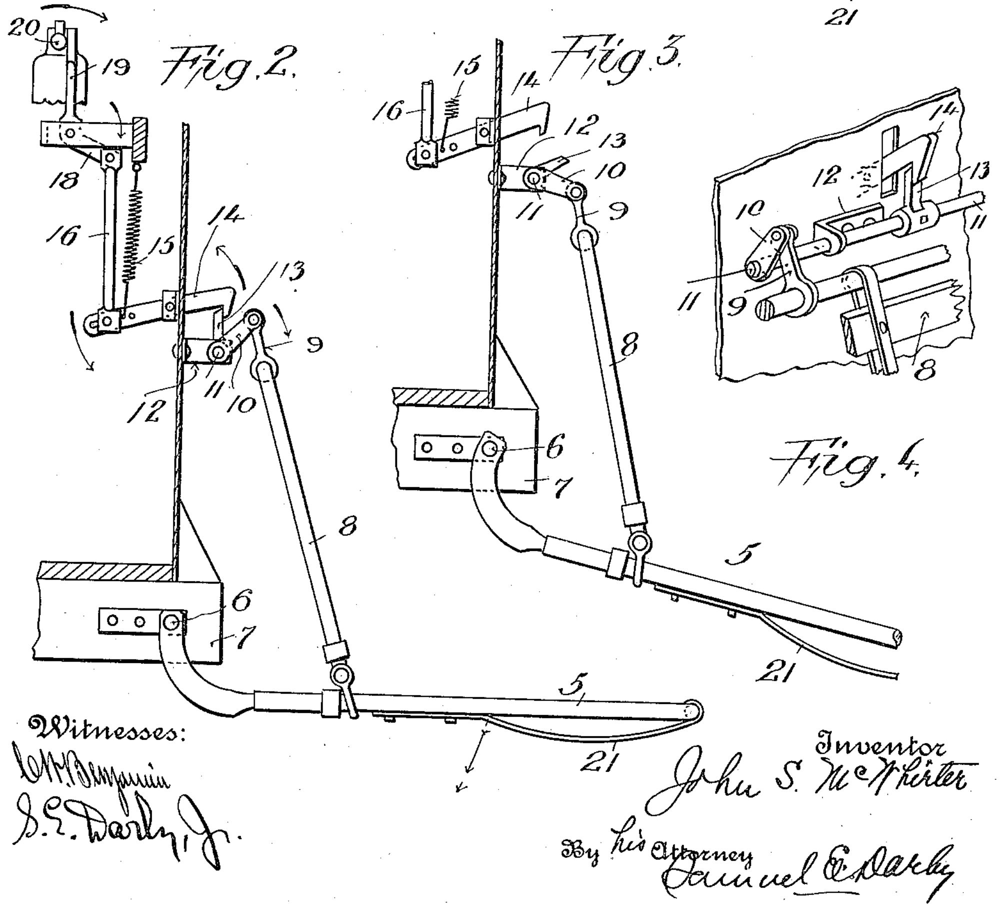

In the accompanying drawings:—Figure 1 is a view in front elevation showing a car fender and a tripping mechanism therefor arranged in accordance with the principles of my invention, the end dash of the car being indicated and broken out. Fig. 2 is a view in side elevation of the same, the dash and framing of the car being in vertical section taken longitudinally of the car. Fig. 3 is a view similar to Fig. 2 showing the fender in tripped position. Fig. 4 is a broken view in perspective showing the tripping mechanism.

The same part is designated by the same reference numeral wherever it occurs throughout the several views.

In the operation of street cars the exigency frequently arises where it is necessary to make an emergency application of the car brakes in order to avert an accident or collision with a pedestrian. Particularly in streets which are crowded or congested with pedestrians such emergencies occur. It sometimes happens that even with an emergency application of the brake mechanism the momentum of the car is so great that a pedestrian is collided with, knocked down and injured by the car running over him before the car is arrested.

It is among the special purposes of my invention to provide a fender which is normally held in retracted position but which is tripped by the actuation of the emergency brake control handle or lever, whereby, in case of an impending collision with a pedestrian the motorman, in operating the emergency brake lever or handle to make emergency application of the brakes, also effects a release of the car fender, thereby permitting the latter to trip into position to catch or pick up a pedestrian if knocked down by a collision and thus avoid running over him even though the emergency application of the brakes be ineffectual to stop the car. The particular form of fender or tripping mechanism therefor is not of consequence so far as the broad scope of my invention is concerned. While therefore, I have shown a specific structure of fender and tripping mechanism I wish it to be understood that the particular form shown is merely illustrative.

In the drawing 5 is a fender which is hinged at 6 to a convenient part 7 of the front end of a car. Connected to the fender is an apron 8 which may be of the usual or any well known type or construction. The upper edge of the apron is connected by links 9 to crank 10 on a rock shaft 11, suitably journaled in brackets 12, at the end of the car. The rock shaft 11 carries a trip arm 13, which, when the fender is in raised or retracted position, is engaged by a dog 14. A spring 15, connected to said dog, normally exerts its tension to hold the dog in engagement with the trip arm. A link 16 is connected at one end to the end of the dog 14, and at the other end to one arm 18 of a bell crank lever, the other arm 19 of said lever being arranged to project into the path of the handle or lever 20 through which emergency application of the brake mechanism (not shown) is effected.

The operation is exceedingly simple. When the lever 20 is thrown to position to effect an emergency application of the brake mechanism, it encounters in its movement the arm 19 of the bell crank lever, thereby rocking said bell crank lever, and, through link 16, rocking or moving the dog 14 out of engagement with the trip arm 13, thereby releasing the fender and permitting the same to swing down, as indicated in Fig. 4.

If desired the fender may be provided with shoes 21 on the under side thereof, to engage on the track rails, when the fender is tripped, to relieve the fender of undue wear.

As above indicated the fender and its trip mechanism may be of any other suitable, convenient or well known type or construction, the important and essential feature of my present invention being the arrangement of the fender tripping mechanism in such relation as to release the retracted fender by the engagement therewith of the emergency brake applying lever or handle.

Having now set forth the objects and nature of my invention and a construction and arrangement embodying the principles thereof, what I claim as new and useful, and of my own invention, and desire to secure by Letters Patent is,—

1. The combination with an emergency brake control handle, of a fender and a tripping mechanism therefor, said tripping mechanism including a member arranged in the path of said handle and operated by contact therewith when said handle is moved toward operating position.

2. The combination with an emergency brake control handle, of a fender, a trip dog therefor, and means for releasing said dog including a member arranged to extend into the path of movement of said handle and operated by contact therewith when said handle is moved toward operating position.

3. The combination with a fender, a rock shaft to which the fender is connected, a trip arm carried by the rock shaft, a trip dog adapted to engage said arm to normally maintain the fender retracted, and a bell crank lever having one arm connected to said dog, of an emergency brake control handle, the other arm of said bell crank lever being arranged to extend into the path of movement of said handle toward operating position.

In testimony whereof I have hereunto set my hand on this 7th day of April, A. D. 1915.

JOHN S. McWHIRTER.

Copies of this patent may be obtained for five cents each, by addressing the "Commissioner of Patents, Washington, D. C."